(12) United States Patent
Ozaki

(10) Patent No.: US 8,711,383 B2
(45) Date of Patent: Apr. 29, 2014

(54) INFORMATION PROCESSING USING BATCH SETTING INFORMATION

(75) Inventor: Hiroshi Ozaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 110 days.

(21) Appl. No.: 13/225,358

(22) Filed: Sep. 2, 2011

(65) Prior Publication Data
US 2012/0086975 A1 Apr. 12, 2012

(30) Foreign Application Priority Data

Oct. 6, 2010 (JP) ................................. 2010-226826
Mar. 22, 2011 (JP) ................................. 2011-062929

(51) Int. Cl.
*G06K 15/00* (2006.01)
*G06F 3/048* (2013.01)

(52) U.S. Cl.
USPC ........ 358/1.14; 358/1.15; 358/1.13; 715/741; 715/847

(58) Field of Classification Search
USPC ........ 358/1.9, 1.13, 1.15, 1.14; 715/204, 273, 715/741, 742, 743, 744, 745, 747, 847
See application file for complete search history.

(56) References Cited

U.S. PATENT DOCUMENTS

| | | | |
|---|---|---|---|
| 7,057,749 B2 | 6/2006 | Ozaki | |
| 7,167,263 B2 | 1/2007 | Takayama et al. | |
| 7,209,250 B2 * | 4/2007 | Nakao | 358/1.15 |
| 8,368,926 B2 * | 2/2013 | Tanaka | 358/1.15 |
| 8,446,613 B2 | 5/2013 | Kujirai | |
| 2003/0112456 A1 * | 6/2003 | Tomita et al. | 358/1.13 |
| 2005/0229106 A1 * | 10/2005 | Labarge et al. | 715/745 |
| 2006/0221372 A1 * | 10/2006 | Onishi et al. | 358/1.13 |
| 2007/0006234 A1 * | 1/2007 | Ogata | 718/101 |
| 2008/0291484 A1 * | 11/2008 | Hoshino et al. | 358/1.15 |
| 2012/0243034 A1 * | 9/2012 | Hirai | 358/1.15 |

FOREIGN PATENT DOCUMENTS

| | | |
|---|---|---|
| CN | 101038538 A | 9/2007 |
| JP | 2000-222159 A | 8/2000 |
| JP | 2002-0773304 A | 3/2002 |

OTHER PUBLICATIONS

Chinese Office Action dated Dec. 6, 2013 issued in corresponding Chinese Patent Application No. 201110303949.5.

* cited by examiner

*Primary Examiner* — Dennis Dicker
(74) *Attorney, Agent, or Firm* — Fitzpatrick, Cella, Harper & Scinto

(57) ABSTRACT

In an information processing apparatus according to this invention, a plurality of pieces of batch setting information each configured by a plurality of pieces of print setting information are registered in advance. A setting of print setting information, use of which is inhibited, of the plurality of pieces of print setting information is accepted. Batch setting information including the print setting information, use of which is inhibited, is specified from the plurality of pieces of batch setting information. Then, a setting screen which allows the user to select pieces of non-specified batch setting information, and does not allow the user to select the specified batch setting information is displayed.

12 Claims, 14 Drawing Sheets

FIG. 5A

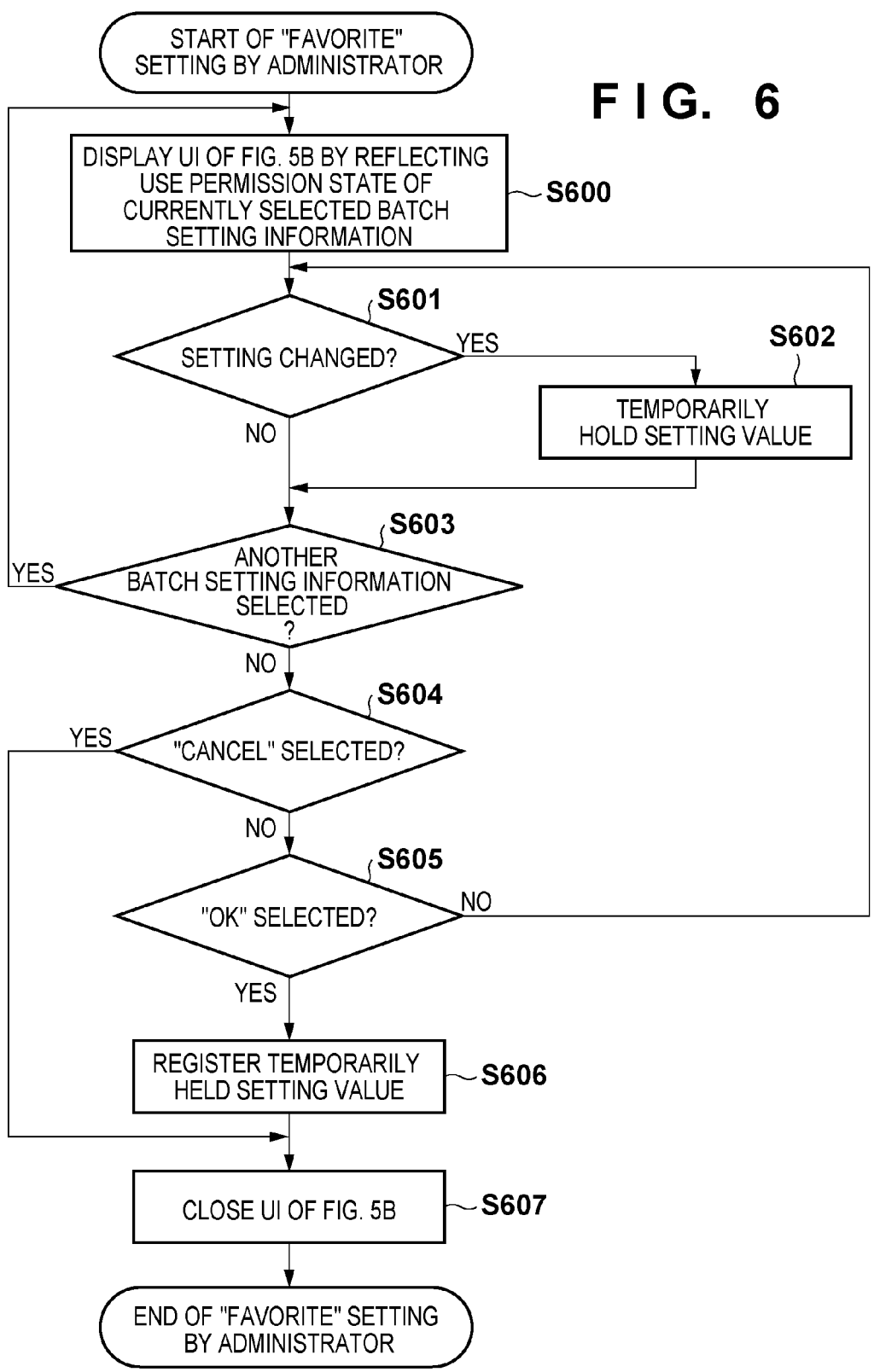

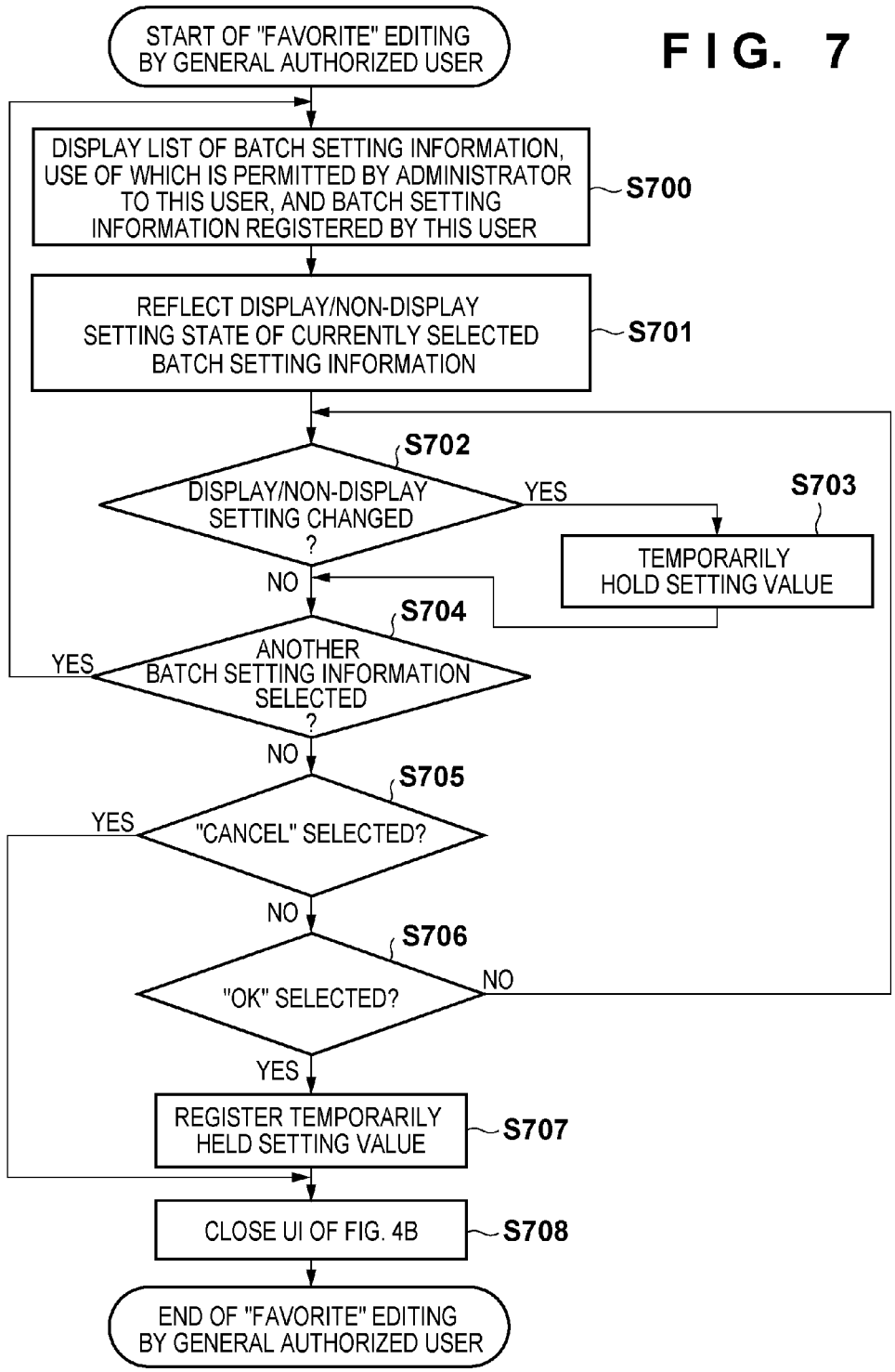

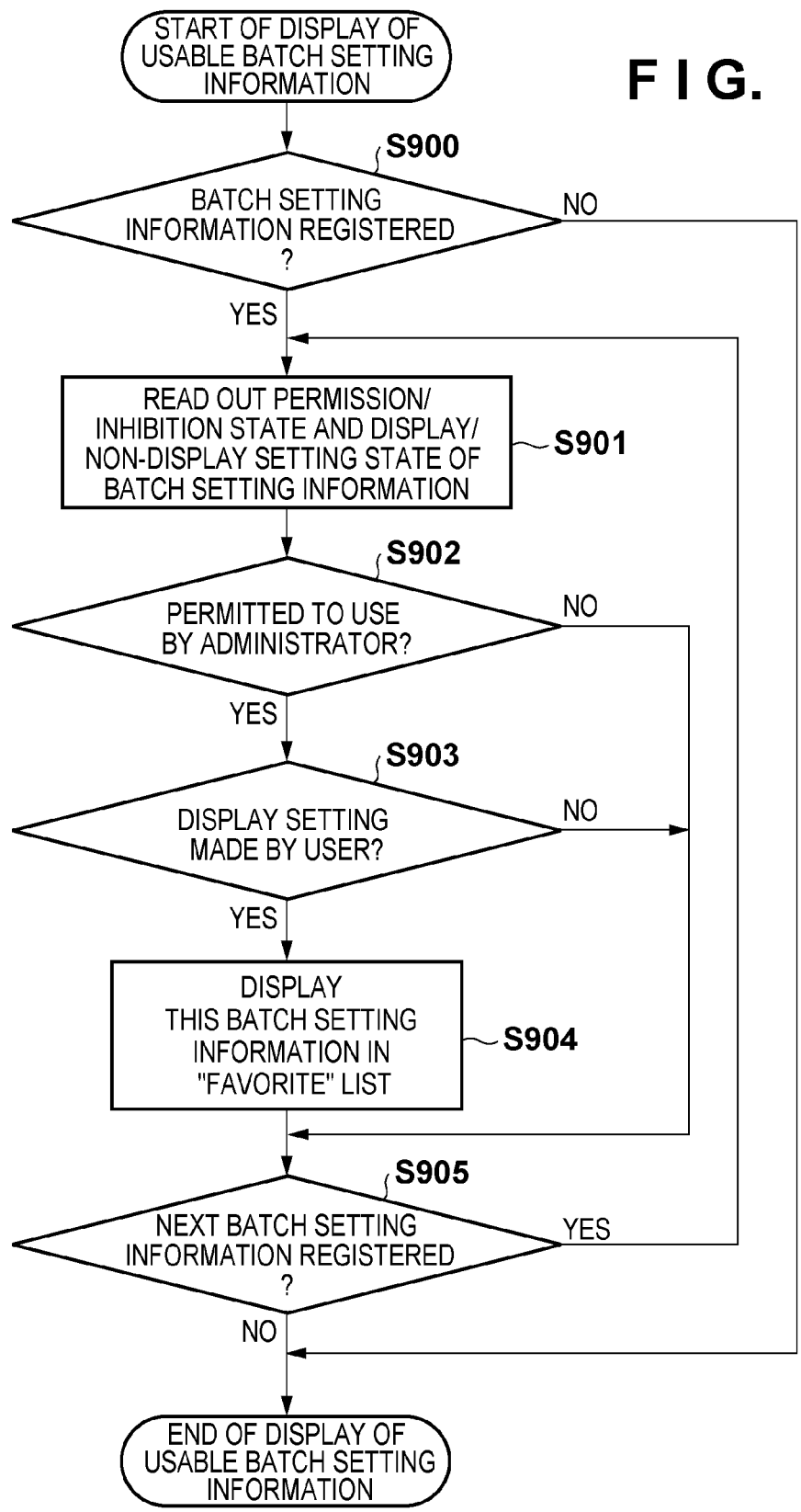

FIG. 11

PROPERTY OF ABCD LBP-xxxx

| GENERAL | SHARING | PORT | ADVANCED SETTING | COLOR MANAGEMENT | SECURITY | DEVICE SETTING | FAVORITE | RESTRICTION SETTING |

RESTRICTION SETTING LIST(L): 1101

☑ FIX "DOUBLE-SIDED" PRINTING (P)

☐ FIX "2 in 1" PRINTING (Z)

☐ FIX "MONOCHROME" PRINTING (N)

[ OK ]  [ CANCEL ]  [ APPLY (A) ]  [ HELP ]

INFORMATION PROCESSING USING BATCH SETTING INFORMATION

BACKGROUND OF THE INVENTION

1. Field of the Invention

The present invention relates to a technique for issuing a print instruction from application software on an OS to a printing apparatus and, more particularly, to a print setting control technique of a printer driver which allows the printing apparatus to execute print processing.

2. Description of the Related Art

As software required to allow a printing apparatus such as a printer to execute print processing, a printer driver is available. An information processing apparatus, which incorporates the printer driver, can set various kinds of print setting information such as a selection of a paper cassette, a setting of a color processing method, and a selection of a paper discharge method. In the printer driver, a plurality of pieces of print setting information can be generally registered as one batch setting information, and by selecting this batch setting information, the plurality of pieces of print setting information which match the purpose intended can be easily set.

For example, Japanese Patent Laid-Open No. 2000-222159 describes a registration method of batch setting information, and setting items which can be registered. Also, Japanese Patent Laid-Open No. 2002-073304 describes a method which gives means for registering batch setting information to a general permission user, and displays the registered batch setting information for only the registered user.

In the related arts, an administrator cannot set whether or not each of a plurality of pieces of batch setting information, which are registered in advance in a printer driver, is provided to a general authorized user. For this reason, when the administrator wants to allow the general authorized user to use only specific batch setting information of the plurality of pieces of batch setting information, a dedicated printer driver, which is preset with only the specific batch setting information, has to be installed. When such dedicated printer driver is installed, and when the administrator wants to change the batch setting information to be used by the general authorized user, a new dedicated printer driver has to be installed again.

SUMMARY OF THE INVENTION

The present invention has been made in consideration of the above situation, and provides a mechanism which can easily restrict batch setting information which is allowed to be used by a user.

According to one aspect of the present invention, an information processing apparatus having a processor, in which a plurality of pieces of batch setting information each configured by a plurality of pieces of print setting information are registered in advance is provided, which comprises: a setting unit, configured to accept a setting of print setting information, use of which is inhibited, of the plurality of pieces of print setting information; a specifying unit, configured to specify batch setting information including the print setting information, use of which is inhibited by the setting unit, from the plurality of pieces of batch setting information; and a display control unit, configured to display a setting screen which allows a user to select pieces of batch setting information which are not specified by the specifying unit, and does not allow the user to select the batch setting information specified by the specifying unit.

According to the present invention, batch setting information which is allowed to be used by a user can be easily restricted.

Further features of the present invention will become apparent from the following description of exemplary embodiments with reference to the attached drawings.

BRIEF DESCRIPTION OF THE DRAWINGS

FIG. 5A shows a UI example including a "favorite" setting tab of the printer driver;

FIG. 6 is a flowchart showing the control sequence at the time of setting of "favorite" by the administrator;

FIG. 7 is a flowchart showing the control sequence at the time of editing of "favorite" by the general authorized user;

FIG. 9 is a flowchart showing the control sequence of "favorite" display processing for the general authorized user;

FIG. 11 shows a setting screen used to designate print setting information, use of which is to be inhibited.

DESCRIPTION OF THE EMBODIMENTS

Embodiments of the present invention will be described in detail hereinafter with reference to the drawings. Note that the following embodiments do not limit the scope of claims, and all of combinations of characteristic features described in the embodiments are not always essential to solving means of the invention. In the following description, a setting list including a plurality of batch settings each configured by a plurality of pieces of print setting information will be described using a name "favorite".

First Embodiment

<System Arrangement (FIG. 1)>

Figure 1:
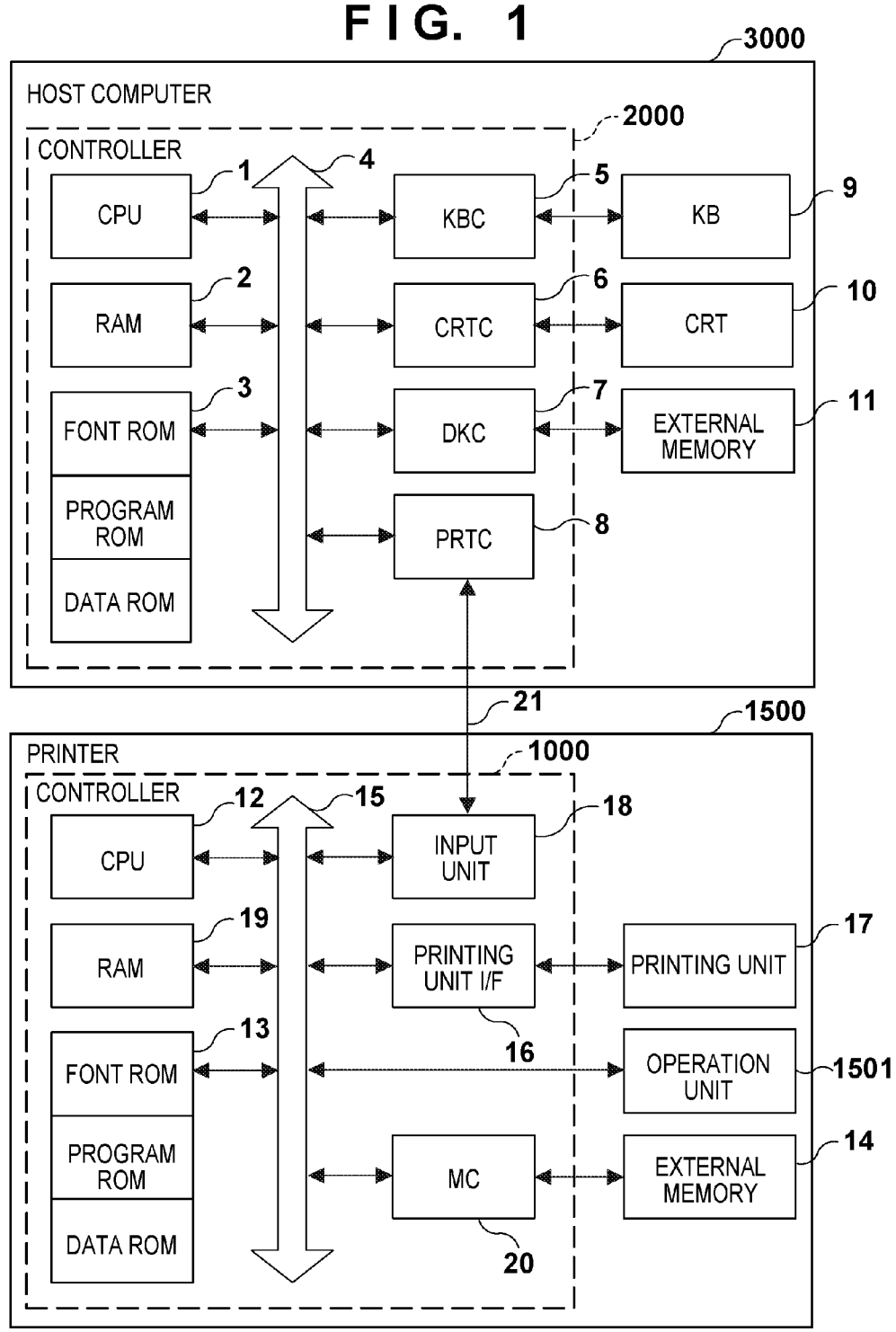
FIG. 1 is a block diagram showing the arrangement of a printing system according to an embodiment of the present invention.

FIG. 1 is a block diagram showing the arrangement of a printing system according to an embodiment of the present invention. Note that a standalone device having functions of the present invention or a system in which the functions of the present invention are distributed to a plurality of devices can be adopted unless otherwise specified. In case of the system, connections may be made via a network such as a LAN or WAN to implement processing.

The printing system according to this embodiment includes a host computer 3000 (information processing apparatus) and a printer 1500 (printing apparatus). The host computer 3000 is an apparatus which sends, to the printing apparatus, printer control commands, which are generated using batch setting information selected by the user from a setting list including a plurality of pieces of batch setting information each configured by a plurality of pieces of print setting information. The host computer 3000 includes a controller 2000, keyboard 9 (KB), CRT display 10 (CRT), and external memory 11. The controller 2000 includes a CPU 1, RAM 2, various ROMs 3, keyboard controller 5 (KBC), CRT controller 6 (CRTC), disk controller 7 (DKC), and printer controller 8 (PRTC).

The CPU 1 executes document processing for a document which includes graphics, images, text, tables (including, for example, spreadsheets), and the like based on a document processing program and the like stored in a program ROM of the ROMs 3 or the external memory 11. Also, the CPU 1 systematically controls respective devices connected to a system bus 4.

The ROMs 3 include a font ROM, the program ROM, and a data ROM. The program ROM of the ROMs 3 or the external memory 11 stores, for example, an operating system program (to be referred to as an OS hereinafter) as a control program of the CPU 1. The font ROM of the ROMs 3 or the external memory 11 stores font data and the like used in the document processing. The data ROM of the ROMs 3 or the external memory 11 stores various data used upon execution of the document processing and the like.

The RAM 2 serves as a main memory, work area, and the like of the CPU 1. The KBC 5 controls key inputs from the KB 9 and a pointing device (not shown). The CRTC 6 controls display of the CRT 10. The DKC 7 controls accesses to the external memory 11 such as a hard disk (HD) and a Floppy® disk (FD), which store a boot program, various applications, font data, user files, edit files, a printer control command generation program (to be referred to as a printer driver hereinafter), and the like.

The PRTC 8 is connected to the printer 1500 via a predetermined two-way interface 21, and executes communication control processing with the printer 1500.

Note that the CPU 1 executes outline font rasterize processing onto a display information RAM (not shown) assured on, for example, the RAM 2 to allow a WYSIWYG function on the CRT 10. The CPU 1 opens various registered windows based on commands instructed by, for example, a mouse cursor (not shown) on the CRT 10, and executes various kinds of data processing. When the user wants to execute print processing, he or she opens a window associated with print settings, and can set print setting information for the printer driver, which information includes printer settings and a selection of a print function.

The printer 1500 includes a controller 1000, printing unit 17 (printer engine), operation unit 1501 (operation panel), and external memory 14. The controller 1000 includes a CPU 12, RAM 19, ROMs 13, input unit 18, printing unit I/F 16, and memory controller 20 (MC). The CPU 12 outputs an image signal as output information to the printing unit 17 connected to a system bus 15 based on, for example, a control program stored in a program ROM of the ROMs 13 or that stored in the external memory 14.

The ROMs 13 include a font ROM, the program ROM, and a data ROM. The program ROM of the ROMs 13 stores a control program of the CPU 12 and the like. The font ROM of the ROMs 13 stores font data and the like used upon generation of the output information. The data ROM of the ROMs 13 stores information and the like used on the host computer when the printer does not include any external memory 14 such as a hard disk.

The CPU 12 can execute communication processing with the host computer via the input unit 18, and is configured to notify the host computer 3000 of information and the like in the printer. The RAM 19 serves as a main memory, work area, and the like of the CPU 12, and is configured to extend its memory capacity by an option RAM connected to an extension port (not shown).

Note that the RAM 19 is used as an output information rasterize area, environment data storage area, NVRAM, and so forth. The MC 20 controls accesses to the external memory 14 such as the aforementioned hard disk (HD) or an IC card. The external memory 14 is connected as an option, and stores font data, emulation programs, form data, and the like.

The input unit 18 is arranged on the aforementioned operation panel, and includes, for example, switches to be operated by the user and LED indicators. The number of external memories 14 described above is not limited to one. The printer may include at least one external memory 14, and may be configured to connect a plurality of external memories including optional font cards in addition to built-in fonts, and external memories which store programs required to interpret printer control languages of different language systems. Furthermore, the printer has an NVRAM (not shown), which may store printer mode setting information from the operation unit 1501.

<Functional Arrangement of Host Computer (FIG. 2)>

Figure 2:
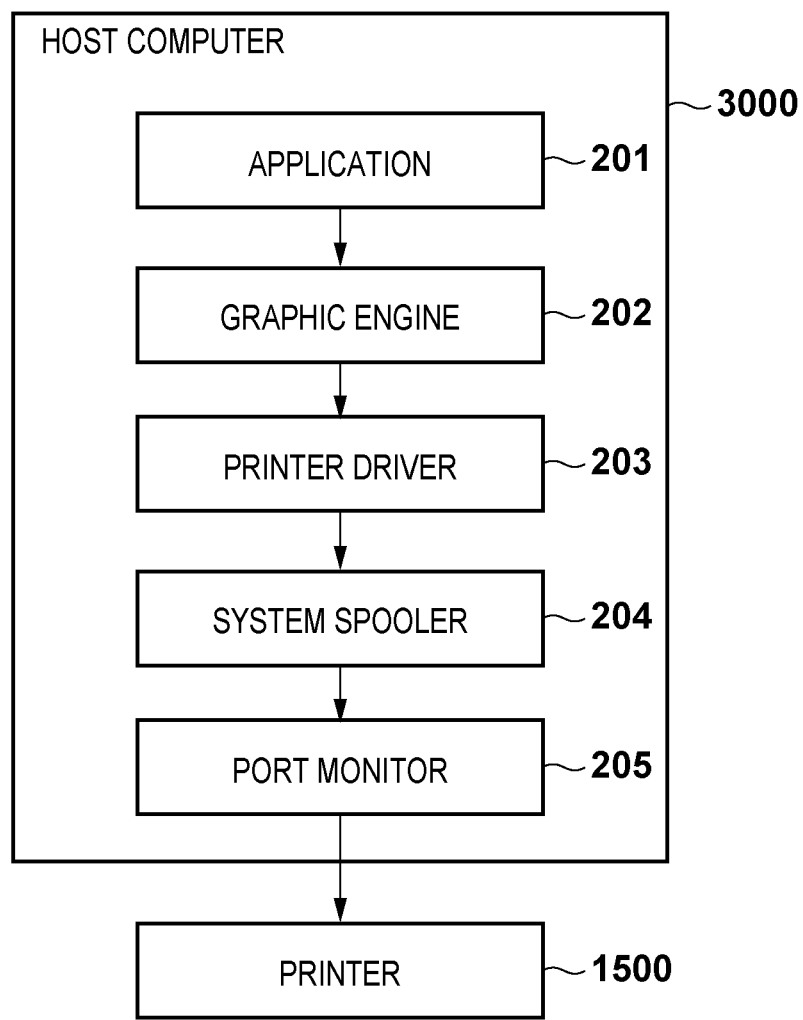
FIG. 2 is a block diagram showing the functional arrangement of a host computer.

FIG. 2 shows the arrangement of typical print processing in the host computer to which the printing apparatus such as the printer is connected directly or via a network. An application 201, graphic engine 202, printer driver 203, system spooler 204, and port monitor 205 exist as files saved in the external memory 11 in the host computer 3000. These files are program modules which are loaded onto the RAM 2 by the OS or modules which use those modules, when they are executed. Note that the printer driver includes a function of generating printer control commands (print job) that the printer can interpret.

The application 201 and printer driver 203 can be added to the HD as the external memory 11 via the FD as the external memory 11, a CD-ROM (not shown), or a network (not shown). The application 201 saved in the external memory 11 is loaded onto the RAM 2 when it is executed. The application 201 executes output (rasterize) processing using the graphic engine 202 which has been similarly loaded onto the RAM 2 and is ready to be executed, when it issues a print instruction to the printer 1500. The graphic engine 202 similarly loads the printer driver 203, which is prepared for each printing apparatus, from the external memory 11 onto the RAM 2, and converts the output from the application 201 into printer control commands using the printer driver 203. The converted printer control commands are output to the printer 1500 via the system spooler 204 and port monitor 205, which have been loaded onto the RAM 2 by the OS, and the interface 21.

<Favorite Function (FIGS. 3 to 5B)>

Figure 3:
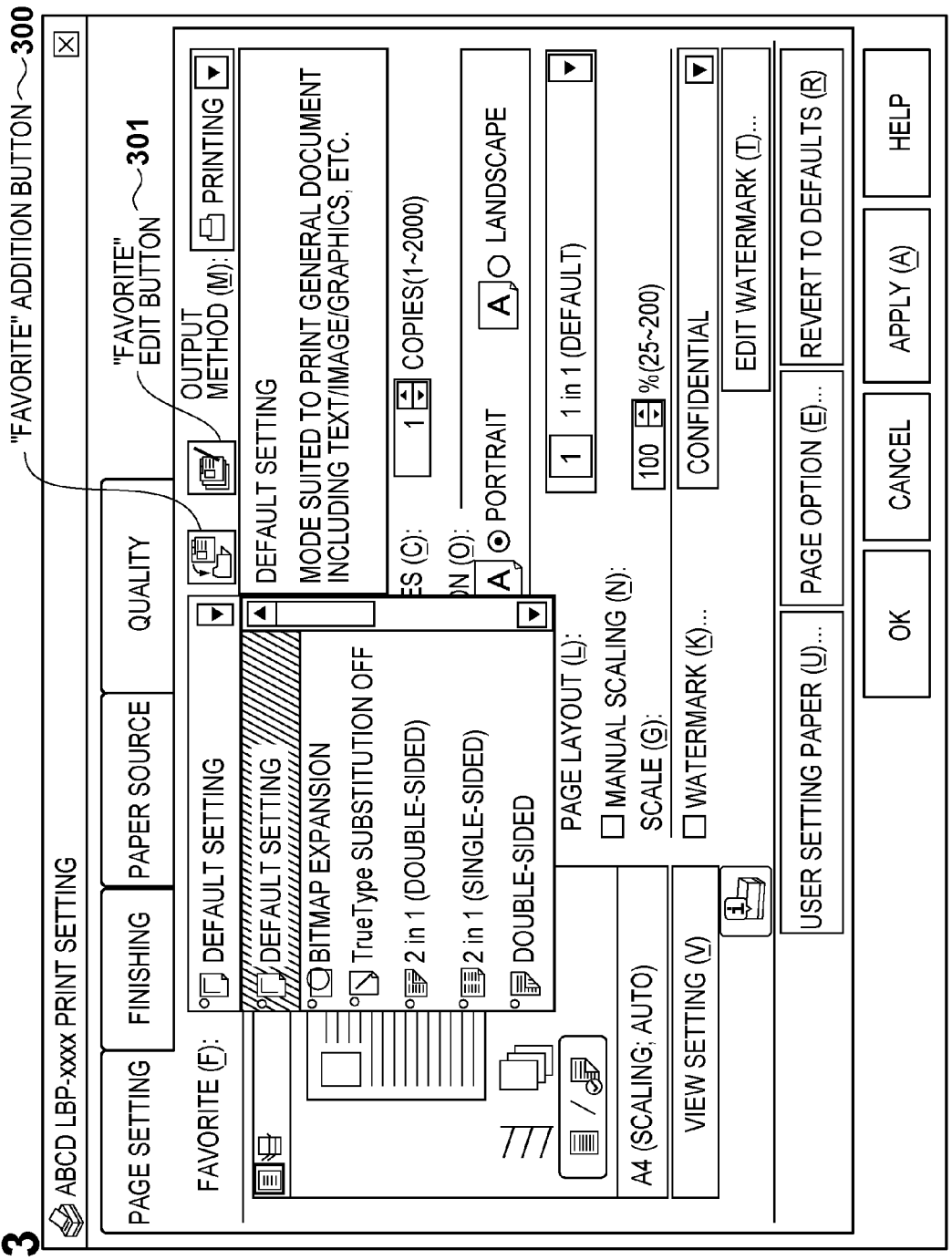
FIG. 3 shows a UI example including a "favorite" function of a printer driver.
Figure 4A:
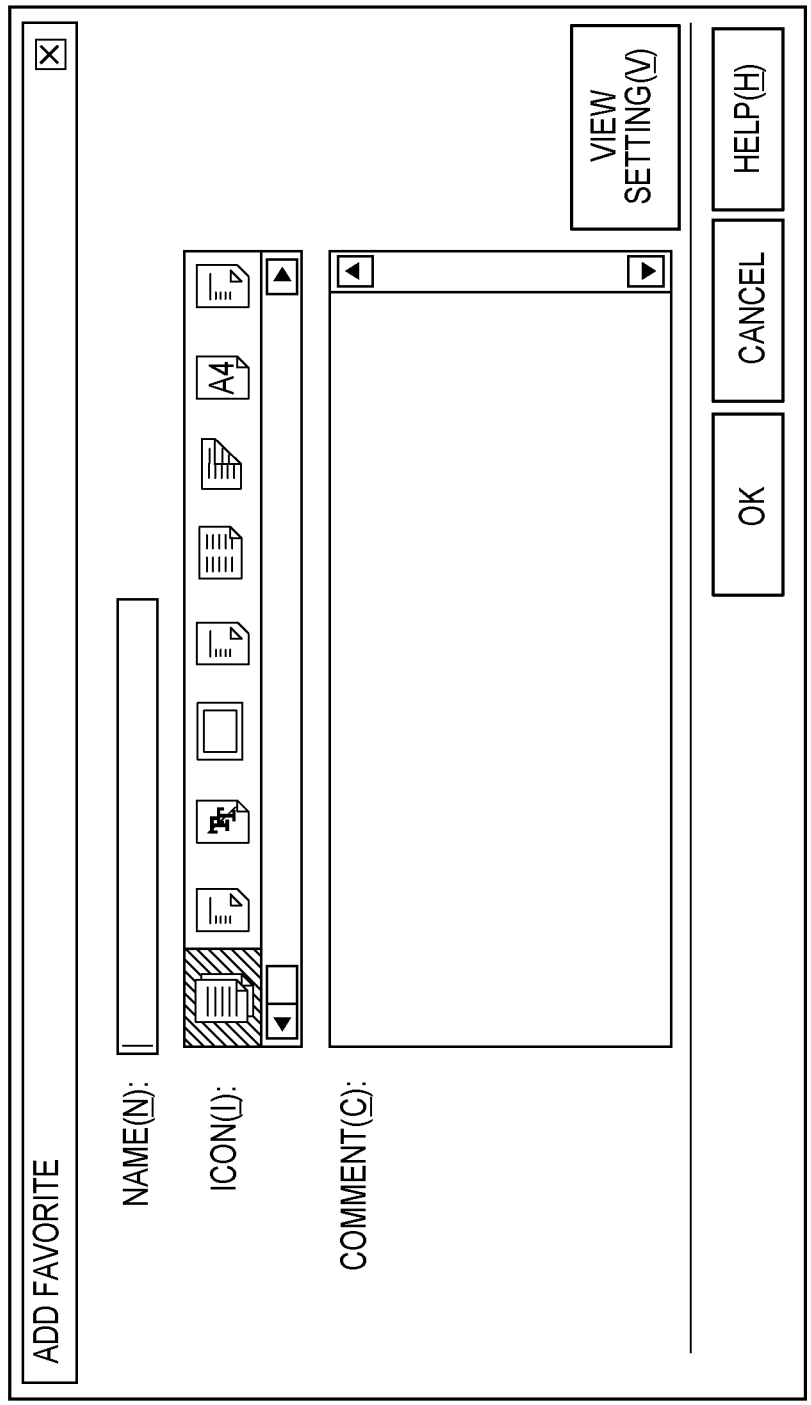
FIG. 4A shows a UI example at the time of additional registration of batch setting information to "favorite" by a general authorized user.
Figure 4B:
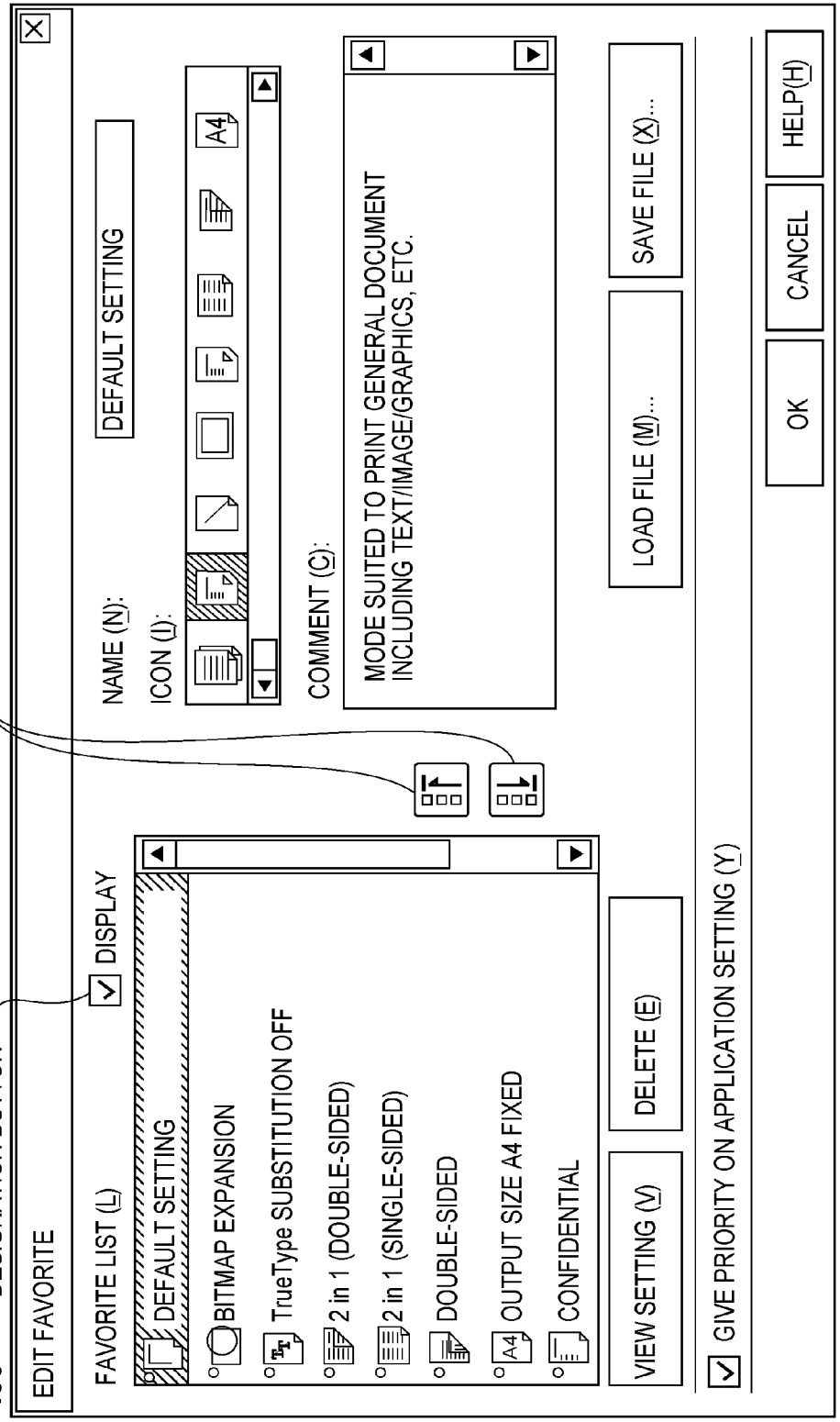
FIG. 4B shows a UI example at the time of editing of "favorite" by the general authorized user.

FIG. 3 shows a UI example used to explain a "favorite" function of the printer driver. When the user selects one of a plurality of pieces of batch setting information registered as "favorite" on the UI (second user interface) shown in FIG. 3, pieces of print setting information included in the selected batch setting information are reflected as pieces of current print setting information. When the user selects a "favorite" addition button 300, a UI shown in FIG. 4A is displayed. When the user selects a "favorite" edit button 301, a UI shown in FIG. 4B is displayed to allow the user to add and edit settings to "favorite". A display designation button 400, which is displayed on the "favorite" edit screen shown in FIG. 4B, allows the user to make a display/non-display setting for each batch setting information of "favorite" as one characteristic feature of the present invention. Only batch setting information of "favorite", for which a display setting is made on the UI in FIG. 4B, is displayed in a "favorite" list shown in FIG. 3. For example, since the display designation button 400 is checked while batch setting information "default setting" is selected on FIG. 4B, "default setting" is displayed on the UI shown in FIG. 3.

Figure 5A:
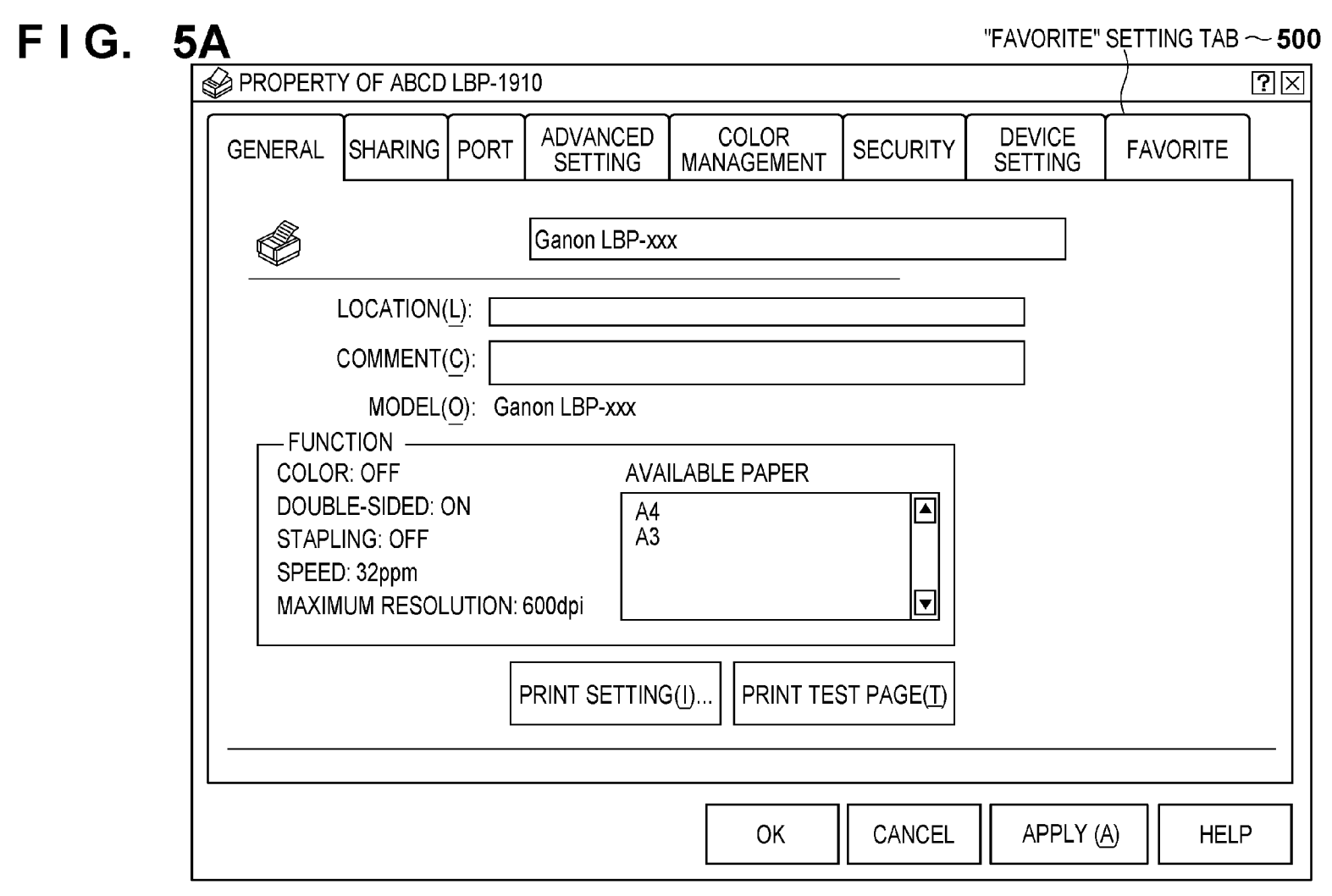
Figure 5B:
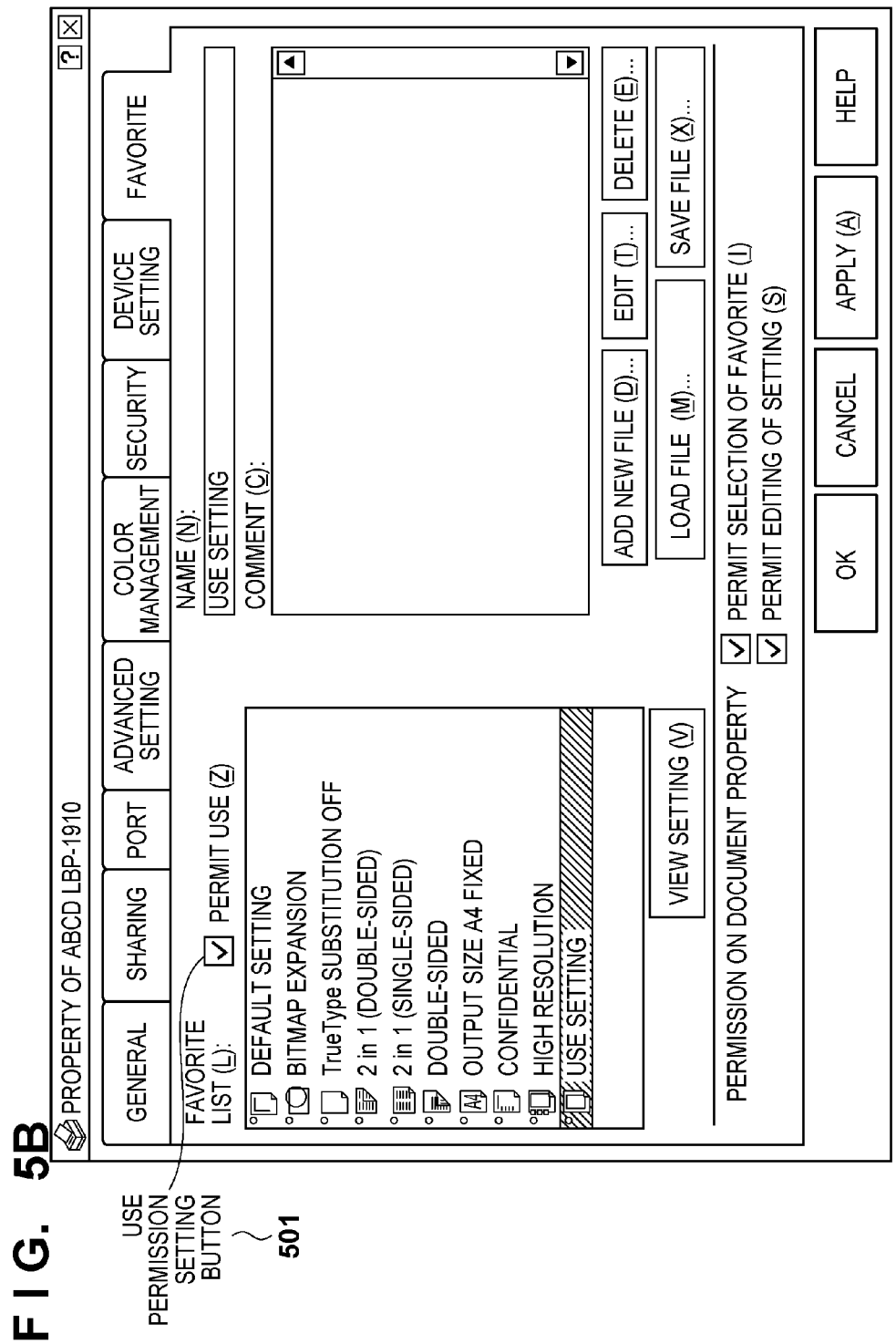
FIG. 5B shows a UI example at the time of setting of "favorite" by an administrator.

FIG. 5A shows a UI example including a "favorite" setting tab 500 which is displayed when the user has an administrative right for the printing apparatus. FIG. 5B shows a "favorite" setting UI example displayed when this "favorite" setting tab 500 is selected. On this "favorite" setting UI (first user interface), whether or not to permit a general authorized user to use each registered batch setting information can be set. The printer driver confirms a right of a process launched from the OS, and when a user has an administrative right for the printing apparatus, and the printer driver judges that user as an administrator. In general, a user who can install and initially set a printer driver is an administrator, and users who set to share the installed printer driver are general authorized users.

"Favorite", use by a general authorized user of which is permitted by a "favorite" use permission setting button 501 shown in FIG. 5B, is displayed on the "favorite" list on the UI of FIG. 3 of the general authorized user. Furthermore, the general authorized user is allowed to set whether or not to display batch setting information, use of which is permitted, on the UI shown in FIG. 4B. With these settings, only batch setting information, use of which is permitted by the administrator, and which the user wants to display is displayed as "favorite".

Note that batch setting information registered (added) by the general authorized user himself or herself is managed as that unique to the user, and whether or not to display that batch setting information is allowed to be set while the user uses the host computer. Also, the control may be made, in such a manner that whether or not to display only batch setting information registered by the user is allowed to be set, and batch setting information, use of which is permitted by the administrator, is always displayed. Furthermore, the control may be made in such a manner that specific batch setting information such as "default setting" preset in the printer driver is always displayed. As a method of controlling to always display aforementioned, the display designation button 400 shown in FIG. 4B may be grayed out while "display" is selected, so as to be inhibited from being changed.

<Favorite Setting Control by Administrator (FIG. 6)>

"Favorite" setting control by the administrator will be described first with reference to the control sequence shown in FIG. 6. Note that the flowchart of the present application is implemented when the CPU 1 reads out a related program from the memory and executes the readout program. When the administrator selects the "favorite" setting tab 500 on the UI shown in FIG. 5A, the controller 2000 of the host computer 3000 displays the "favorite" setting UI while reflecting a use permission state of the currently selected batch setting information, as shown in FIG. 5B (S600). For example, assume that use of batch setting information set with a name "user setting" is permitted. In this state, when the UI shown in FIG. 5B is displayed in this state, and the administrator selects "user setting", this UI is displayed while a use permission check box is checked.

The controller 2000 determines whether or not the administrator changes the use permission setting by the use permission setting button 501 (S601). If the administrator changes the use permission setting (YES in S601), the controller 2000 temporarily holds that value (S602). If the administrator selects another batch setting information (YES in S603), the controller 2000 repeats the above operations.

If the administrator instructs to close the UI by a cancel button (YES in S604), the controller 2000 discards the data temporarily held in step S602, and closes the UI (S607). If the administrator instructs to close the UI by an OK button (YES in S605), the controller 2000 registers the data temporarily held in step S602 as an authorized setting value (S606), and closes the UI (S607), thus ending the setting processing. If the administrator selects neither the cancel button nor the OK button (NO in S604 and S605), the process returns to step S601, and the controller 2000 repeats the processes.

Figure 8A:
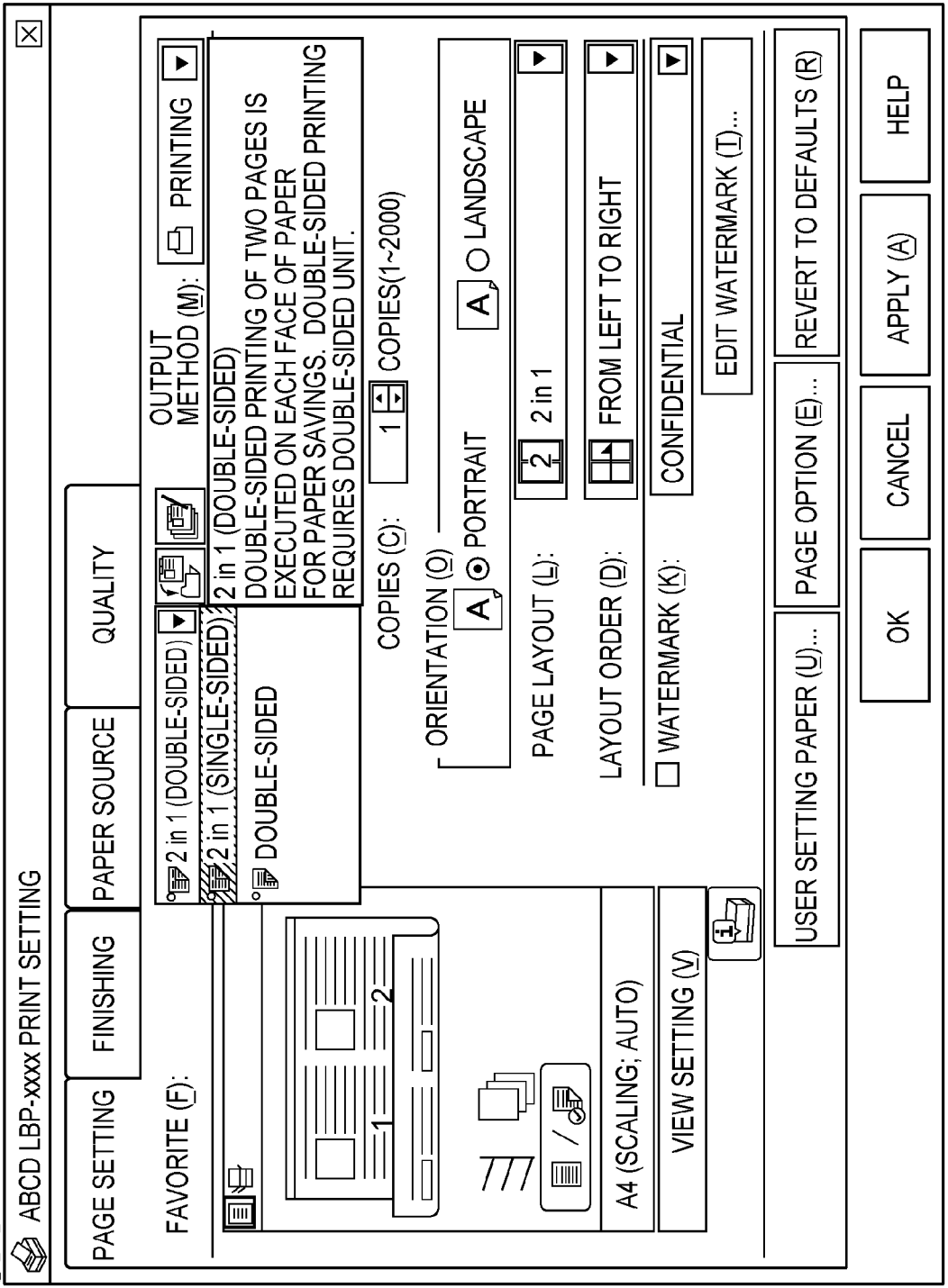
FIG. 8A shows a UI example which displays "favorite", use of which is permitted by the administrator.

With the above processes, the administrator sets batch setting information, use by a general authorized user of which is permitted. FIG. 8A shows a UI example when the administrator permits use of only pieces of batch setting information "2 in 1 (double-sided)" and "double-sided" in FIG. 5B.

Also, when the printer driver has a function of allowing the administrator to restrict use of print setting information by a general authorized user, use of batch setting information including use-inhibited print setting information may be automatically inhibited. For example, when only a "double-sided print" setting of a "single-sided/double-sided print" setting is selectable, use of only batch setting information including a "double-sided print" setting of those which have been registered is automatically permitted, and use of batch setting information including a "single-sided print" setting is inhibited.

A plurality of pieces of batch setting information created by a manufacturer of the printer driver are often registered in advance in the printer driver. In this case, when use of the "single-sided print" setting is inhibited, as described above, a UI that does not allow the user to select batch setting information including the "single-sided print" setting is displayed. As a practical example, a UI shown in FIG. 8A is displayed. Note that print setting information, use of which is to be inhibited, is not limited to "single-sided print". For example, use of "1 in 1", "color print", and the like may be inhibited. As an inhibition method, a setting screen shown in FIG. 11 is used to designate settings. In the example of FIG. 11, since a check box 1101 which indicates a "fix 'double-sided' print" setting is checked, it indicates that use of the "single-sided print" is inhibited. The aforementioned processing will be described below with reference to the flowchart shown in FIG. 10. Note that this flowchart is implemented when the CPU 1 reads out a related program from the memory and executes the readout program.

The controller 2000 sets use-inhibited print setting information according to an instruction of the administrator (S1001). The process in step S1001 corresponds to inhibition of use of the "single-sided print" and "1 in 1" settings described above using FIG. 11. The controller 2000 specifies batch setting information including use-inhibited print setting information from a plurality of pieces of batch setting information, which have already been registered (S1002). This process is implemented when the controller confirms whether or not a plurality of pieces of print setting information that configure each registered batch setting information include print setting information inhibited in step S1001.

The controller 2000 generates and displays a UI which does not allow the user to select the batch setting information specified in step S1002 (S1003). As described above, when use of the "single-side print" setting is inhibited, the UI shown in FIG. 8A is displayed in step S1003. On this UI, "single-side print" is not displayed as an option, so that the user cannot select this option. Note that the present invention is not limited to this format. For example, a screen which grays out such option to disable its selection may be generated.

Figure 8B:
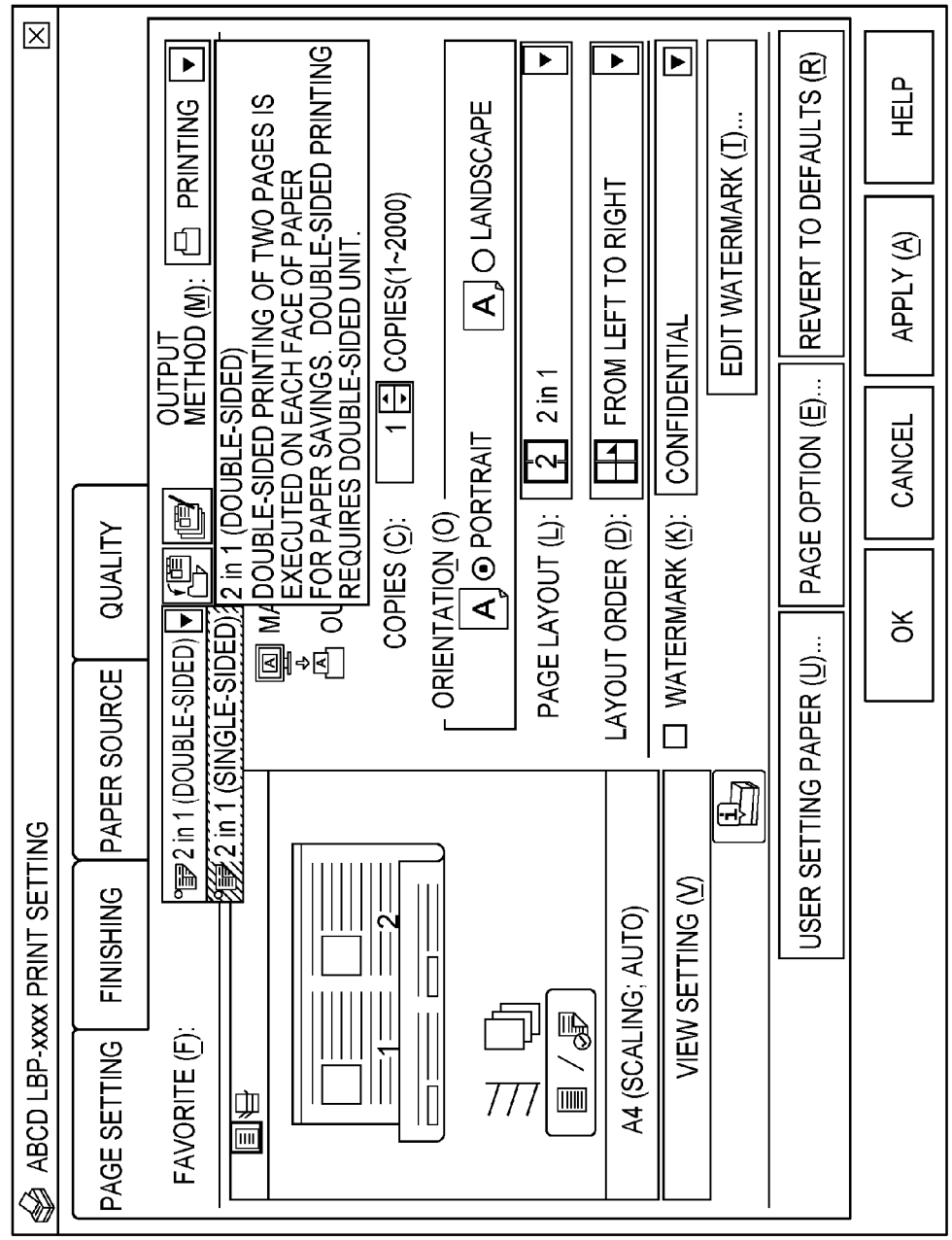
FIG. 8B shows a UI example which displays "favorite" for which the general authorized user makes a display setting.
Figure 10:
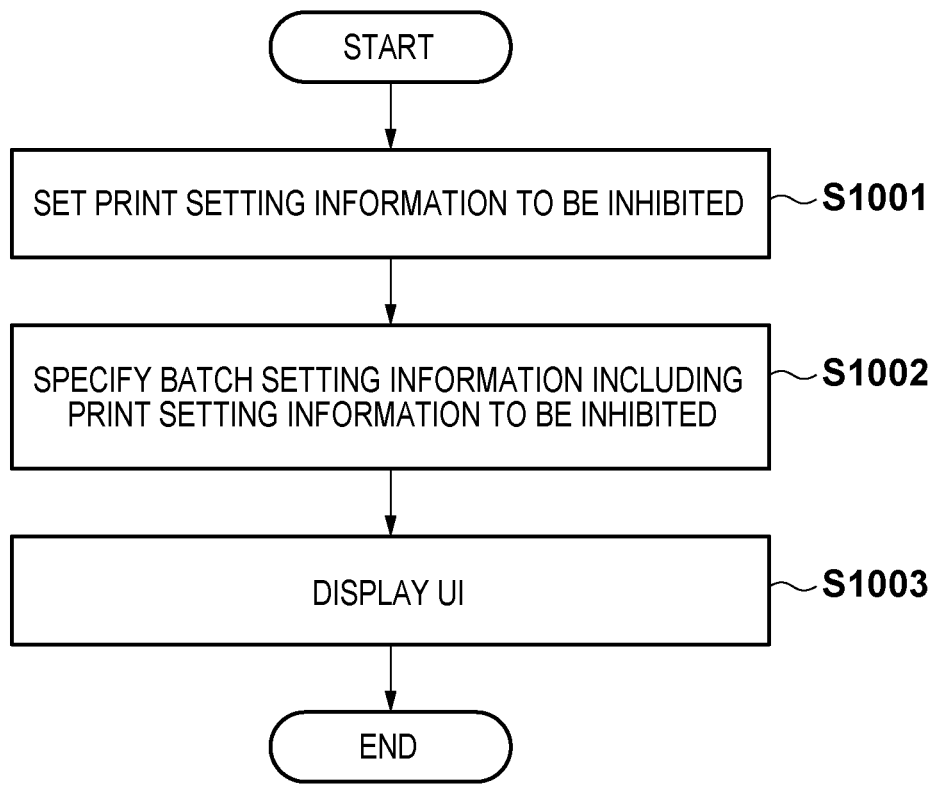
FIG. 10 is a flowchart showing the control sequence for specifying "favorite" including use-inhibited print setting information.

Note that after the processing in FIG. 10, the user may set batch setting information which is not displayed. For example, after the administrator inhibits use of "single-sided print", when a general authorized user restricts display of batch setting information "double-sided", a UI shown in FIG. 8B is displayed. Note that when a plurality of pieces of print setting information are inhibited from being used, a UI which does not allow the user to select batch setting information including the plurality of pieces of use-inhibited print setting information is displayed.

<Favorite Display Setting Control by General Authorized User (FIGS. 7, 8A and 8B)>

"Favorite" display/non-display setting control by a general authorized user will be described below with reference to the control sequence shown in FIG. 7. When the general authorized user selects the "favorite" edit button 301 on the UI shown in FIG. 3, the controller 2000 of the host computer 3000 displays the "favorite" edit UI shown in FIG. 4B. When the printer driver operated by the general authorized user displays the "favorite" edit UI, the controller 2000 displays a list of pieces of batch setting information, use of which is permitted by the administrator, and those which are registered by the general authorized user himself or herself (S700). The controller 2000 reflects a display/non-display setting state of the currently selected batch setting information on the "favorite" display designation button 400 (S701). For example, assume that it is set to permit use of batch setting information set with a name "default setting". In this state, when the UI in FIG. 4B is displayed, and the user selects "default setting", the display check box 400 is displayed while being checked.

Assume that an initial value of a display/non-display setting of each batch setting information is "display". Also, the display order of the currently selected batch setting information can be changed using display order change buttons 401. In this embodiment, assume that pieces of batch setting information are registered and managed according to the set display order.

If the user changes the display/non-display setting of the currently selected batch setting information (YES in S702), the controller 2000 temporarily holds that value (S703). If the user selects another batch setting information (YES in S704), the controller 2000 repeats the above operations for the changed batch setting information. If the user instructs to close the UI by a cancel button (YES in S705) without selecting another batch setting information (NO in S704), the controller 2000 discards the data temporarily held in step S703, and closes the UI (S708). If the user instructs to close the UI by an OK button (YES in S706), the controller 2000 registers the data temporarily held in step S703 as an authorized setting value (S707), and closes the UI (S708), thus ending the edit processing. Note that the display/non-display setting can be made for batch setting information which is added by the user using the "favorite" addition UI shown in FIG. 4A.

With the above processing, only pieces of batch setting information that the user wants to display can be displayed. When the user sets a display setting for batch setting information "2 in 1 (double-sided)", and cancels a display setting for batch setting information "double-sided" on the UI shown in FIG. 8A, the UI shown in FIG. 8B is displayed. Note that a display/non-display setting can be made for all pieces of batch setting information which can be used by the general authorized user. Alternatively, a setting range may be limited. For example, a display/non-display setting is allowed to made for only batch setting information additionally registered by the user.

<Batch Setting Information Display Control by General Authorized User (FIG. 9)>

Batch setting information display control in the host computer operated by the general authorized user will be described below with reference to FIG. 9. The controller 2000 of the host computer 3000 determines whether batch setting information is registered (S900). If no batch setting information is registered (NO in S900), the controller 2000 ends the display processing. If batch setting information is registered (YES in S900), the controller 2000 reads out a permission/inhibition state by the administrator and a display/non-display setting state by the general authorized user in that batch setting information (S901).

Next, the controller 2000 determines based on the permission/inhibition state read out in step S901 whether or not use of the batch setting information is permitted by the administrator (S902). If use of batch setting information is not permitted (NO in S902), the process of the controller 2000 jumps to step S905 without displaying the current batch setting information of interest on the UI shown in FIG. 3 (or FIG. 8A or 8B). On the other hand, if use of that batch setting information is permitted (YES in S902), the controller 2000 determines based on the display/non-display state read out in step S901 whether or not the user makes a display setting for the current batch setting information of interest (S903). If the user makes the display setting for that batch setting information (YES in S903), the controller 2000 displays the current batch setting information of interest on the UI shown in FIG. 3 (or FIG. 8A or 8B) (S904). If the user makes a non-display setting for the current batch setting information of interest (NO in S903), the process of the controller 2000 jumps to step S905 without displaying this batch setting information on the UI shown in FIG. 3 (or FIG. 8A or 8B).

The controller 2000 determines whether or not next batch setting information is registered (S905). If the next batch setting information is registered (YES in S905), the process returns to step S901, and the controller 2000 repeats the processes. That is, the controller 2000 executes the above operations for all pieces of registered batch setting information. On the other hand, if the above processes are complete for all pieces of registered batch setting information, and it is determined that no next batch setting information is registered (NO in S905), the controller 2000 ends the display control of batch setting information to be displayed on the "favorite" list of the UI.

When the administrator permits use of only pieces of batch setting information "2 in 1 (double-sided)" and "double-sided", and when the general authorized user makes a display setting for only "2 in 1 (double-sided)", the UI shown in FIG. 8B is displayed. With the above processing, of batch setting information, use of which is permitted by the administrator, and that which is registered by a general authorized user, only the batch setting information, for which the user makes a display setting, is displayed.

As described above, according to this embodiment, a mechanism that allows the administrator to more easily restrict use of a plurality of pieces of batch setting information included in a setting list by a user having no administrative right can be provided.

In the above related arts, all pieces of batch setting information registered by the administrator and those registered by the general authorized user himself or herself are displayed in addition to a plurality of pieces of batch setting information registered in advance in the printer driver. For this reason, it is not easy for the general authorized user to select batch setting information that he or she wants to use in practice. However, according to the present invention, a mechanism which allows to display only pieces of batch setting information selected by the user having no administrative right as a setting list can be provided. Thus, the user can easily select batch setting information, thus improving the convenience.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-226826, filed Oct. 6, 2010, and 2011-062929, Mar. 22, 2011, which are hereby incorporated by reference herein in their entirety.

What is claimed is:

1. An information processing apparatus, said apparatus comprising:
   a first display control unit configured to display a setting screen that receives an instruction to fix a predetermined print setting;
   a setting unit configured to receive the instruction to fix the predetermined print setting in accordance with the instruction input via the setting screen;
   a specifying unit configured to specify batch setting information including a print setting, a use of which is inhibited by fixing the predetermined print setting, the batch setting information including a plurality of print settings; and
   a second display control unit configured to display a print setting screen which allows a user to select batch setting information which is not specified, and does not allow the user to select the specified batch setting information.

2. A control method of an information processing apparatus having a processor, the method comprising:
   a first display control step of displaying a setting screen that receives an instruction to fix a predetermined print setting;
   a receiving step of receiving the instruction to fix the predetermined print setting in accordance with the instruction input via the setting screen;
   a specifying step of specifying batch setting information including a print setting use of which is inhibited by fixing the predetermined print setting, the batch setting information including a plurality of print settings; and
   a second display control step of displaying a print setting screen which allows a user to select batch setting information which is not specified, and does not allow the user to select the specified batch setting information.

3. A non-transitory storage medium storing a program for controlling a computer to execute a control method, said method comprising:
   a first display step of displaying a setting screen that receives an instruction to fix a predetermined print setting;
   a receiving step of receiving the instruction to fix the predetermined print setting in accordance with the instruction input via the setting screen;
   a specifying step of specifying batch setting information including a print setting use of which is inhibited by fixing the predetermined print setting, the batch setting information including a plurality of print settings; and
   a second display control step of displaying a print setting screen which allows a user to select batch setting information which is not specified, and does not allow the user to select the specified batch setting information.

4. The apparatus according to claim 1, wherein the second display control unit is configured to display a print setting screen on which the batch setting information which is not specified is contained and the specified batch setting information is not contained.

5. The apparatus according to claim 1, wherein the second display unit is configured to display a print setting screen on which the batch setting information which is not specified is contained and the specified batch setting information is grayed out.

6. The apparatus according to claim 1, wherein a single-sided print setting is inhibited by fixing a double-sided printing.

7. The method according to claim 2, wherein, in the second displaying step, a print setting screen is displayed, on which the batch setting information which is not specified is contained and the specified batch setting information is not contained.

8. The method according to claim 2, wherein, in the second displaying step, a print setting screen is displayed, on which the batch setting information which is not specified is contained and the specified batch setting information is grayed out.

9. The method according to claim 2, wherein a single-sided print setting is inhibited by fixing a double-sided printing.

10. The medium according to claim 3, wherein, in the second displaying step, a print setting screen is displayed, on which the batch setting information which is not specified is contained and the specified batch setting information is not contained.

11. The medium according to claim 3, wherein, in the second displaying step, a print setting screen is displayed, on which the batch setting information which is not specified is contained and the specified batch setting information is grayed out.

12. The medium according to claim 3, wherein a single-sided print setting is inhibited by fixing a double-sided printing.

* * * * *